(12) United States Patent
Lee et al.

(10) Patent No.: US 11,226,486 B2
(45) Date of Patent: Jan. 18, 2022

(54) HEAD-UP DISPLAY DEVICE FOR PROVIDING THREE-DIMENSIONAL AUGMENTED REALITY

(71) Applicant: SAMSUNG ELECTRONICS CO., LTD., Suwon-si (KR)

(72) Inventors: Jinho Lee, Suwon-si (KR); Elena Gennadievna Malinovskaya, Moscow (RU); Igor Vitalievich Yanusik, Podolsk (RU); DongKyung Nam, Yongin-si (KR); Yoonsun Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/458,313

(22) Filed: Jul. 1, 2019

(65) Prior Publication Data
US 2020/0192093 A1 Jun. 18, 2020

(30) Foreign Application Priority Data
Dec. 12, 2018 (KR) .................. 10-2018-0160250

(51) Int. Cl.
*G02B 27/00* (2006.01)
*G02B 27/01* (2006.01)
*G06F 3/01* (2006.01)

(52) U.S. Cl.
CPC ..... *G02B 27/0103* (2013.01); *G02B 27/0025* (2013.01); *G06F 3/013* (2013.01); *B60R 2300/205* (2013.01); *B60R 2300/308* (2013.01); *G02B 2027/011* (2013.01); *G02B 2027/014* (2013.01); *G02B 2027/0138* (2013.01)

(58) Field of Classification Search
CPC ............ G02B 27/0103; G02B 27/0025; G02B 2027/011; G02B 2027/0138; G02B 2027/014; G06F 3/013; B60R 2300/205; B60R 2300/308
See application file for complete search history.

(56) References Cited

U.S. PATENT DOCUMENTS

| 4,218,111 A | 8/1980 | Withrington et al. |
| 8,867,138 B2* | 10/2014 | Kobayashi ......... G02B 27/0101 359/630 |
| 2010/0222957 A1* | 9/2010 | Ohta ...................... B60K 35/00 701/31.4 |

(Continued)

FOREIGN PATENT DOCUMENTS

| EP | 1284432 A1 | 2/2003 |
| JP | 06-026438 Y2 | 7/1994 |

(Continued)

*Primary Examiner* — Towfiq Elahi
(74) *Attorney, Agent, or Firm* — Sughrue Mion, PLLC

(57) ABSTRACT

Disclosed is a head-up display (HUD) device for providing three-dimensional (3D) augmented reality (AR). The HUD display includes a display disposed in an upper region of a windshield of a vehicle, the display configured to output a light corresponding to a panel image in a direction of a dashboard region in a vicinity of a lower portion of the windshield, and an optical element disposed in the dashboard region, the optical element configured to reflect the light corresponding to the panel image in a direction of an intermediate region of the windshield.

19 Claims, 14 Drawing Sheets

(56) References Cited

U.S. PATENT DOCUMENTS

| | | | |
|---|---|---|---|
| 2016/0124231 A1* | 5/2016 | Watanabe | G02B 13/16 |
| | | | 359/633 |
| 2016/0152184 A1* | 6/2016 | Ogawa | B60R 1/00 |
| | | | 345/589 |
| 2017/0163911 A1* | 6/2017 | El-Ghoroury | G09G 3/3413 |
| 2018/0089899 A1* | 3/2018 | Piemonte | G06T 15/205 |
| 2019/0025580 A1* | 1/2019 | Nagano | G02B 27/64 |
| 2019/0034731 A1 | 1/2019 | Lee et al. | |
| 2019/0105879 A1* | 4/2019 | Aoki | B32B 17/10779 |
| 2019/0196189 A1* | 6/2019 | Kim | G02B 30/27 |
| 2020/0192109 A1 | 6/2020 | Lee et al. | |

FOREIGN PATENT DOCUMENTS

| | | |
|---|---|---|
| JP | 2001-208999 A | 8/2001 |
| JP | 2017-68251 A | 4/2017 |
| KR | 1993-0001537 B1 | 3/1993 |
| KR | 1996-0016721 B1 | 12/1996 |
| KR | 1997-0011527 B1 | 7/1997 |
| KR | 10-0154274 B1 | 12/1998 |
| KR | 10-2008-0007772 A | 1/2008 |
| KR | 10-1519352 B1 | 5/2015 |
| KR | 10-2016-0068488 A | 6/2016 |
| KR | 10-2016-0069032 A | 6/2016 |
| KR | 10-2018-0093490 A | 8/2018 |
| WO | WO2012156124 A1 * | 11/2012 |

\* cited by examiner

1110

1120

HEAD-UP DISPLAY DEVICE FOR PROVIDING THREE-DIMENSIONAL AUGMENTED REALITY

CROSS-REFERENCE TO RELATED APPLICATION

This application is based on and claims priority from Korean Patent Application No. 10-2018-0160250, filed on Dec. 12, 2018 in the Korean Intellectual Property Office, the disclosure of which is incorporated herein by reference in its entirety.

BACKGROUND

1. Field

Methods and apparatuses consistent with the disclosure relate to a head-up display (HUD) device for providing three-dimensional (3D) augmented reality (AR).

2. Description of the Related Art

A head-up display (HUD) system may generate a virtual image in front of a driver and display information in the virtual image, thereby providing the user with a variety of information. The information provided to the driver may include, for example, navigation information and dashboard information such as a vehicle speed, a fuel level, and an engine revolution per minute (RPM). The driver may more easily recognize the information displayed in front without turning his or her gaze during driving, and thus, driving safety may be improved. In addition to the navigation information and the dashboard information, the HUD system may also provide the driver with, for example, a lane indicator, a construction indicator, an accident indicator, a pedestrian detection indicator using augmented reality (AR), to assist with driving when a view is not clear.

SUMMARY

One or more exemplary embodiments may address the above problems and/or disadvantages and other problems and/or disadvantages not described above. Also, the exemplary embodiments are not required to overcome the disadvantages described above, and an exemplary embodiment may not overcome any of the problems described above.

According to an aspect of the disclosure, there is provided a head-up display (HUD) device for providing three-dimensional (3D) augmented reality (AR), the HUD device comprising: a processor configured to generate first images including a 3D virtual object, and render a second image based on the first images; a display provided in an upper region of a windshield of a vehicle, the display configured to output a light corresponding to the second image in a direction of a dashboard region of the vehicle in a vicinity of a lower portion of the windshield; and an optical element provided in the dashboard region of the vehicle, the optical element configured to reflect the light corresponding to the second image in a direction of an intermediate region of the windshield.

The first images may include a third image corresponding to a first viewpoint and a fourth image corresponding to a second viewpoint, wherein the processor is further configured to render the second image based on eye positions of a user, the third image, and the fourth image.

The processor may be further configured to determine a target position at which the 3D virtual object is to be represented based on a position of a real object associated with the 3D virtual object, and generate the third image and the fourth image based on the eye positions of the user and the target position.

The display may comprise: a display panel configured to display the second image; and a 3D optical layer configured to control a path of the light corresponding to the second image.

The 3D optical layer may be one of a parallax barrier, a lenticular lens, and a directional backlight unit (BLU).

The optical element may comprise a holographic mirror or an aspheric mirror configured to enlarge the second image.

The display may comprise a laser scanner configured to form a virtual display layer to represent the second image through laser scanning.

The HUD device may further comprise: a holographic optical element (HOE) configured to control a path of a light corresponding to the virtual display layer.

The optical element may comprise a holographic mirror, and the HOE is provided on a top surface of the holographic mirror.

The laser scanner may further configured to form virtual pixels on the virtual display layer by controlling an on/off timing of a laser light source.

The laser scanner may comprise a first laser light source configured to output a red beam, a second laser light source configured to output a green beam, and a third laser light source configured to output a blue beam, and the laser scanner may further configured to form red, green, and blue virtual subpixels in each of the virtual pixels by controlling on/off timings of the first laser light source, the second laser light source, and the third laser light source.

The processor may further configured to determine pixel values of the virtual pixels based on the second image, wherein the laser scanner may be further configured to control the on/off timings of the first laser light source, the second laser light source, and the third laser light source based on the determined pixel values.

The HOE may be recorded based on a lenticular lens or a micro lens array.

The HOE may be recorded to provide a 3D image corresponding to the second image in a viewing space based on a position of the laser scanner and a position of the viewing space.

The HUD device may further comprise: an aspheric lens configured to compensate for a distortion occurring in the second image due to a shape of the windshield.

According to another aspect of the disclosure, there is provided a head-up display (HUD) device for providing three-dimensional (3D) augmented reality (AR), the HUD device comprising: a processor configured to generate first images including a 3D virtual object, and render a second image based on the first images; a display provided in an upper region of a windshield of a vehicle, the display configured to output a light corresponding to the second image, in a direction of a dashboard region of the vehicle in a vicinity of a lower portion of the windshield, using a 3D optical layer configured to control a path of the light corresponding to the second image and a display panel configured to display the second image; and an optical element provided in the dashboard region of the vehicle, the optical element configured to reflect the light corresponding to the second image in a direction of an intermediate region of the windshield.

The first images may include a third image corresponding to a first viewpoint and a fourth image corresponding to a second viewpoint, wherein the processor may be further configured to render the second image based on eye positions of a user, the third image, and the fourth image.

The processor may be further configured to determine a target position at which the 3D virtual object is to be represented based on a position of a real object associated with the 3D virtual object, and generate the third image and the fourth image based on the eye positions of the user and the target position.

According to another aspect of the disclosure, there is provided a head-up display (HUD) device for providing three-dimensional (3D) augmented reality (AR), the HUD device comprising: a processor configured to generate first images including a 3D virtual object, and render a second image based on the first images; a laser scanner provided in an upper region of a windshield of a vehicle, the laser scanner configured to form a virtual display layer to represent the second image by performing laser scanning with a light corresponding to the second image in a direction of a dashboard region of the vehicle in a vicinity of a lower portion of the windshield; a holographic optical element (HOE) provided in the dashboard region of the vehicle, the HOE configured to control a path of a light corresponding to the virtual display layer; and a holographic mirror provided on a bottom surface of the HOE, the holographic mirror configured to reflect the light corresponding to the virtual display layer and passing through the HOE in a direction of an intermediate region of the windshield.

The first images may include a third image corresponding to a first viewpoint and a fourth image corresponding to a second viewpoint.

The processor may be further configured to determine a target position at which the 3D virtual object is to be represented based on a position of a real object associated with the 3D virtual object, generate the third image and the fourth image based on eye positions of a user and the target position, and render the second image based on the eye positions of the user, the third image, and the fourth image.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
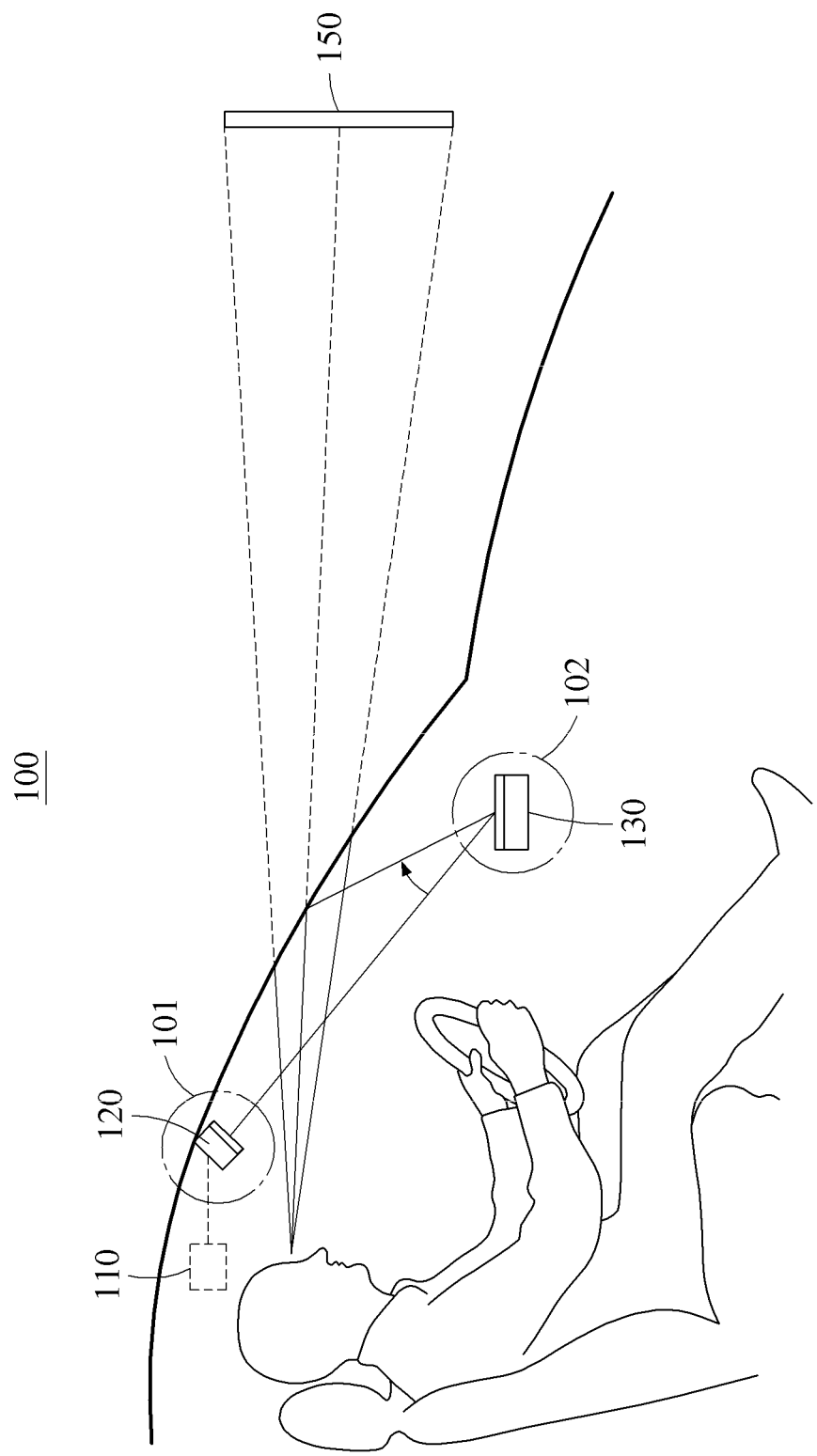
FIG. 1 illustrates a head-up display (HUD) device according to an exemplary embodiment.

The following structural or functional descriptions are to merely describe the exemplary embodiments, and the scope of the exemplary embodiments is not limited to the descriptions provided in the specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the disclosure.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, exemplary embodiments will be described in detail with reference to the accompanying drawings, wherein like reference numerals refer to the like elements throughout.

FIG. 1 illustrates a head-up display (HUD) device according to an exemplary embodiment.

Referring to FIG. 1, a HUD device 100 may include a processor 110, a display 120, and an optical element 130. A light corresponding to a panel image output by the display 120 may be reflected by the optical element 130 and a windshield of a vehicle and provided to a user. The user may observe a three-dimensional (3D) virtual object represented on a virtual screen 150 through the windshield.

The HUD device 100 may provide augmented reality (AR). For example, the HUD device 100 may provide, through AR, dashboard information, navigation information, a lane indicator, a construction indicator, an accident indicator, and a pedestrian detection indicator. To provide AR through a HUD system, a large representation image and a wide field of view (FOV) are required. In general, a representation image and an FOV are affected by the size of the HUD system. However, since only a limited space is available in a dashboard of a vehicle, it may be difficult to secure a sufficiently large representation image and a sufficiently wide FOV by increasing the size of the HUD system.

The display 120 configured to output an image and the optical element 130 configured to enlarge and reflect the image may be disposed at separate positions in the HUD device 100. Thus, a space occupied by an existing HUD box in the dashboard may be minimized. Further, when a distance between the display 120 and the optical element 130 increases, the display 120 may be miniaturized, and a large screen and a wide FOV may be achieved as effects of an increase in projection distance.

The HUD device 100 may provide 3D AR. A virtual object represented at a relatively short distance and a real object at a relatively long distance may not be viewed clearly at the same time, and the virtual object may not be represented at an accurate position using two-dimensional (2D) AR due to a difference between a left viewpoint and a right viewpoint. 3D AR may represent a predetermined depth and provide different images to both eyes, and thus be suitable for AR implementation. The HUD device 100 may represent the virtual object at an accurate position through 3D AR.

The processor 110 may generate an image, which may be a panel image according to an embodiment. The processor 110 may generate source images corresponding to a plurality of viewpoints based on eye positions of the user, and render the panel image based on the generated source images. For example, the source images may include an image, hereinafter, referred to as the first image, corresponding to a first viewpoint, for example, a viewpoint corresponding to a left eye, and an image, hereinafter, referred to as the second image, corresponding to a second viewpoint, for example, a viewpoint corresponding to a right eye. The processor 110 may render the panel image based on the eye positions of the user, the first image, and the second image. FIG. 1 illustrates the processor 110 being disposed above a head of the user. However, the processor 110 may be disposed at another position. For example, the processor 110 may be disposed in the dashboard. According to an embodiment, the panel image may include information related to the vehicle and/or information related to driving the vehicle. For instance, information displayed on the panel image may be navigation information and dashboard information such as a vehicle instrument information, i.e., vehicle speed, a fuel level, an engine revolution per minute (RPM) etc. According to another embodiment, other information can be displayed as the panel image.

The source images may include a virtual object. The processor 110 may display the virtual object at a position corresponding to a real object associated with the virtual object. For example, a HUD may display information related to a travelling direction of the vehicle, lane information, and dangerous object information as virtual objects at positions corresponding to real objects. Hereinafter, a position at which a virtual object is to be displayed on a background will be referred to as a target position. The processor 110 may determine a target position at which the virtual object is to be represented based on a position of the real object, and generate the first image and the second image based on the eye positions of the user and the target position.

To display the virtual object accurately at the target position, a transformation relationship between a coordinate system of an eye tracking camera and a coordinate system of the virtual screen 150, 3D information related to the background, and eye position information may be required. The 3D information related to the background may be obtained through a 3D sensor or a camera facing a forward direction of the vehicle. The eye positions of the user may be obtained through the eye tracking camera facing the user. The display 120 may display the virtual object at intersection points between the virtual screen 150 and lines connecting the target position and the eye positions of the user.

Figure 2:
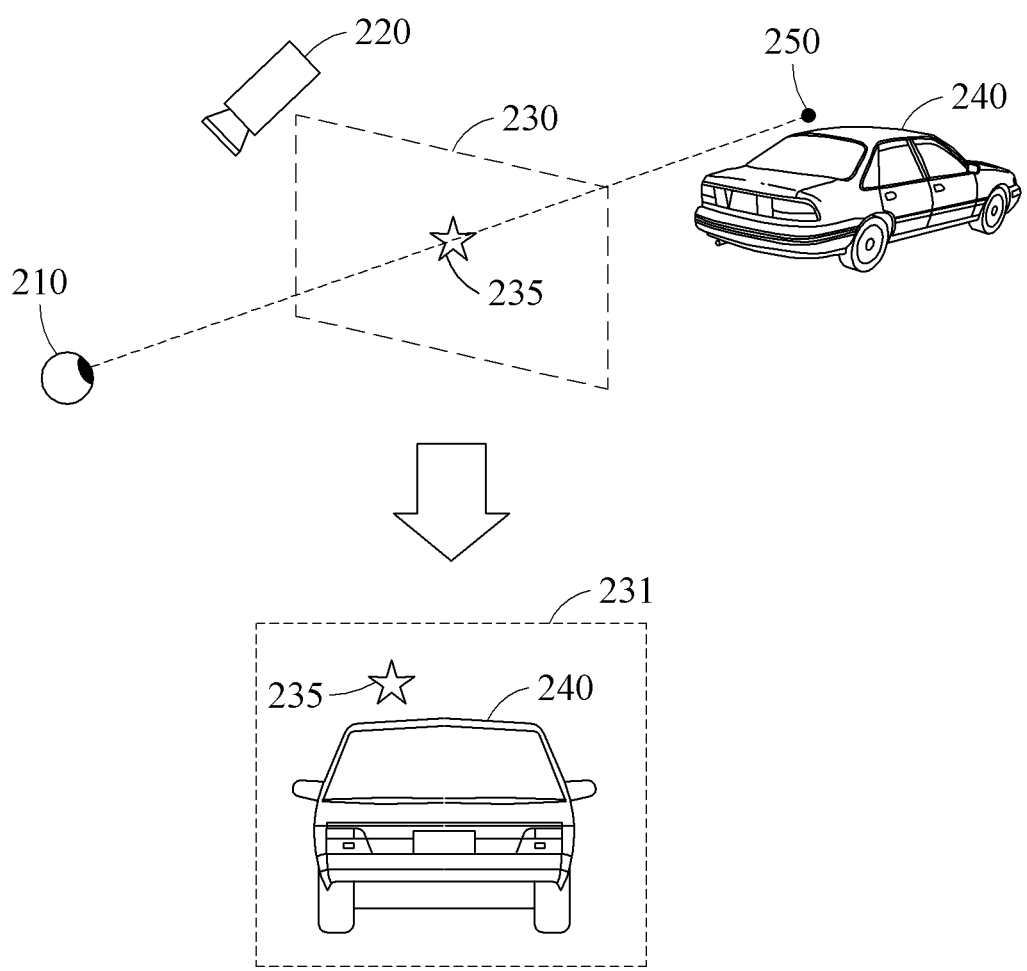
FIG. 2 illustrates three-dimensional (3D) augmented reality (AR) according to an exemplary embodiment.

FIG. 2 illustrates 3D AR according to an exemplary embodiment. Referring to FIG. 2, a virtual object 235 may be displayed at an intersection point between a virtual screen 230 and a line connecting a target position 250 and an eye 210 of a user. The eye 210 of the user may be tracked through an eye tracking camera 220. In this example, a virtual screen 231 may be observed at a position of the eye 210. The virtual screen 231 may include the virtual object 235 and a real object 240. The virtual object 235 may be displayed accurately at the target position. The above process may be performed separately with respect to both eyes. For example, a left image may be generated such that the virtual object 235 may be displayed at an intersection point between the virtual screen 230 and a line connecting the target position 250 and the left eye, and a right image may be generated such that the virtual object 235 may be displayed at an intersection point between the virtual screen 230 and a line connecting the target position 250 and the right eye. Through the above process, 3D AR may be provided.

Referring back to FIG. 1, the display 120 may be disposed in an upper region 101 of the windshield of the vehicle, and output a light corresponding to the panel image in a direction of a dashboard region 102 in a vicinity of a lower portion of the windshield. The windshield of the vehicle may be divided into an upper portion and the lower portion based on an intermediate portion at which the virtual screen 150 is observed. A range including a vicinity of each portion may be referred to as a region. For example, the upper region 101 of the windshield may refer to the upper portion of the windshield and a vicinity of the upper portion of the windshield.

The display 120 may be implemented based on a display panel or a laser scanner. The display panel may represent an image through a physical panel, and the laser scanner may represent an image through an afterimage formed by quickly scanning a beam to a predetermined region, hereinafter, also referred to as a virtual display layer. First, an example in which the display 120 is implemented based on the display panel will be described with reference to FIG. 3.

Figure 3:
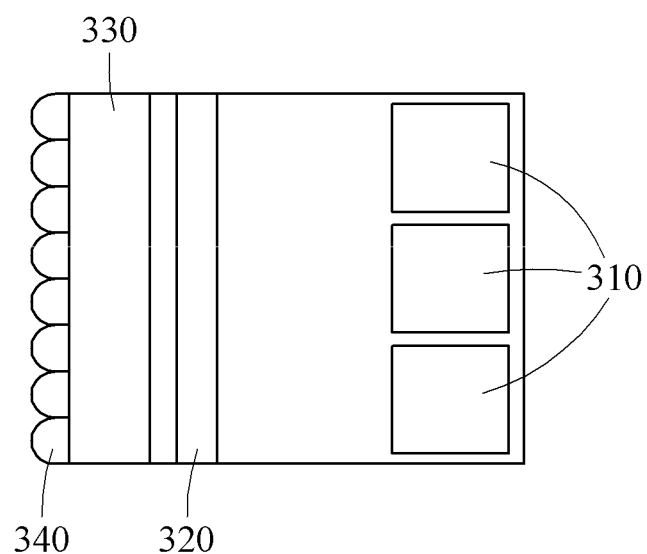
FIG. 3 illustrates a panel-based display according to an exemplary embodiment.

FIG. 3 illustrates a panel-based display according to an exemplary embodiment. Referring to FIG. 3, a display 300 may include a light source 310, a diffuser 320, a display panel 330, and a 3D optical layer 340.

The light source 310 may correspond to a backlight unit (BLU). The light source 310 may include a white light emitting diode (LED), a red/green/blue (R/G/B) LED, or an R/G/B laser light source. When an aspheric mirror is used as an enlarging and reflecting mirror, the white LED, the R/G/B LED, and the R/G/B laser light source may be all used. However, when a holographic mirror is used, the R/G/B LED or the R/G/B laser light source may be used based on a recording characteristic. The diffuser 320 may be implemented in a form of a film. A light uniformity between the light source 310 and the display panel 330 may be secured through the diffuser 320.

The display panel 330 may include a spatial light modulator (SLM) such as a liquid crystal on silicon (LCoS) and a digital light processor (DLP), or a liquid crystal display (LCD) panel. The 3D optical layer 340 may be one of a parallax barrier, a lenticular lens, and a directional BLU. The display panel 330 may display a panel image, and the 3D optical layer 340 may control a path of a light corresponding to the panel image. For example, the 3D optical layer 340 may assign a directivity to the light corresponding to the panel image such that different images may be provided to both eyes of a user.

Figure 4:
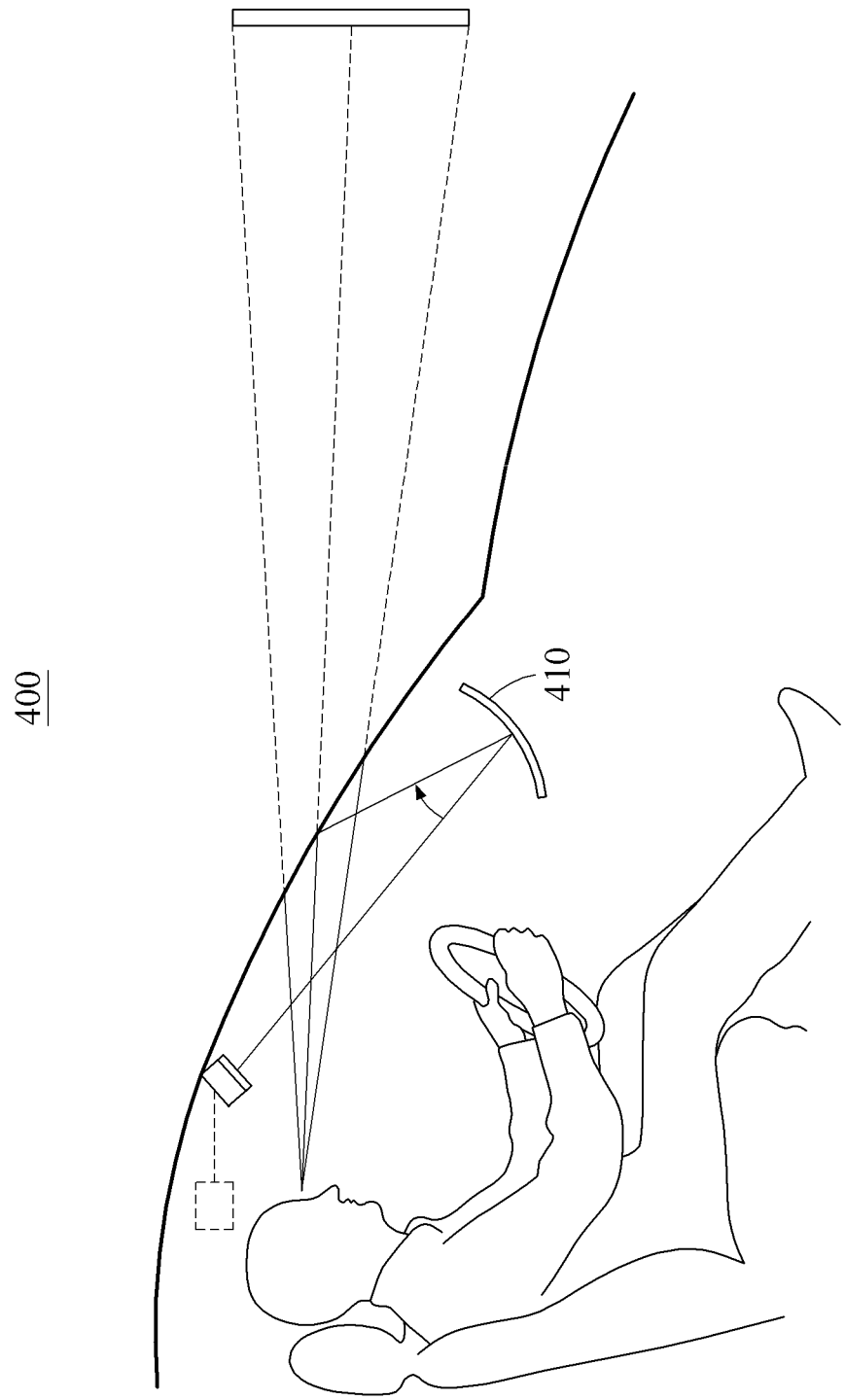
FIG. 4 illustrates a HUD device according to an exemplary embodiment.
Figure 5:
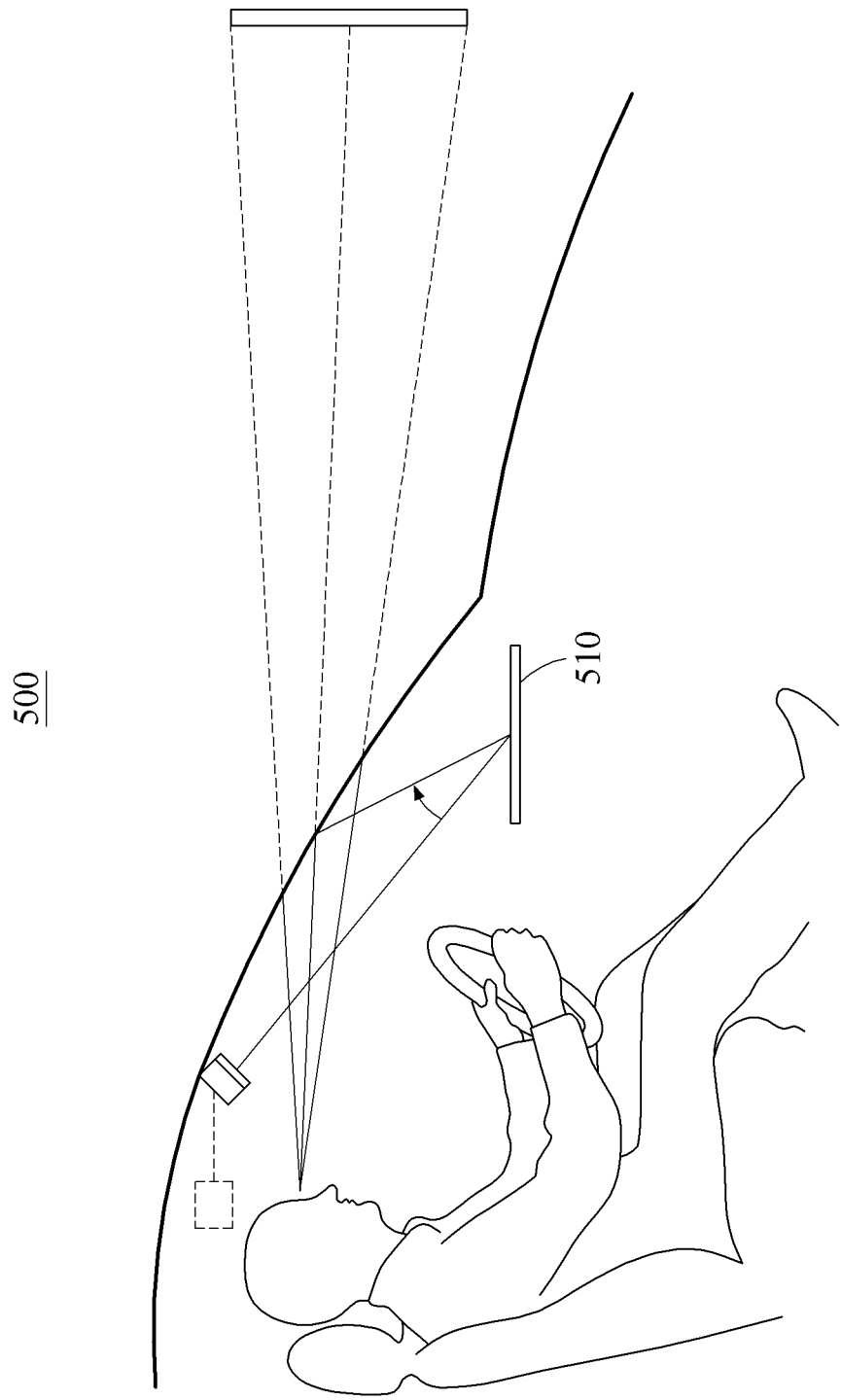
FIG. 5 illustrates a HUD device according to an exemplary embodiment.

Referring back to FIG. 1, the optical element 130 may be disposed in the dashboard region 102 in the vicinity of the lower portion of the windshield, and reflect the light corresponding to the panel image in a direction of an intermediate region of the windshield. The optical element 130 may correspond to an enlarging and reflecting mirror configured to enlarge and reflect the panel image. For example, the optical element 130 may include an aspheric mirror or a holographic mirror to enlarge the panel image. The aspheric mirror and the holographic mirror are illustrated in FIGS. 4 and 5, respectively. Referring to FIGS. 4 and 5, a HUD system 400 may include an aspheric mirror 410 as an enlarging and reflecting mirror, and a HUD system 500 may include a holographic mirror 510 as an enlarging and reflecting mirror. The holographic mirror 510 may be recorded to enlarge an image corresponding to an incident light. For example, the holographic mirror 510 may be recorded based on the aspheric mirror 410. The holographic mirror 510 may have a flat shape and thus, occupy a relatively small space, when compared to the aspheric mirror 410.

Figure 6:
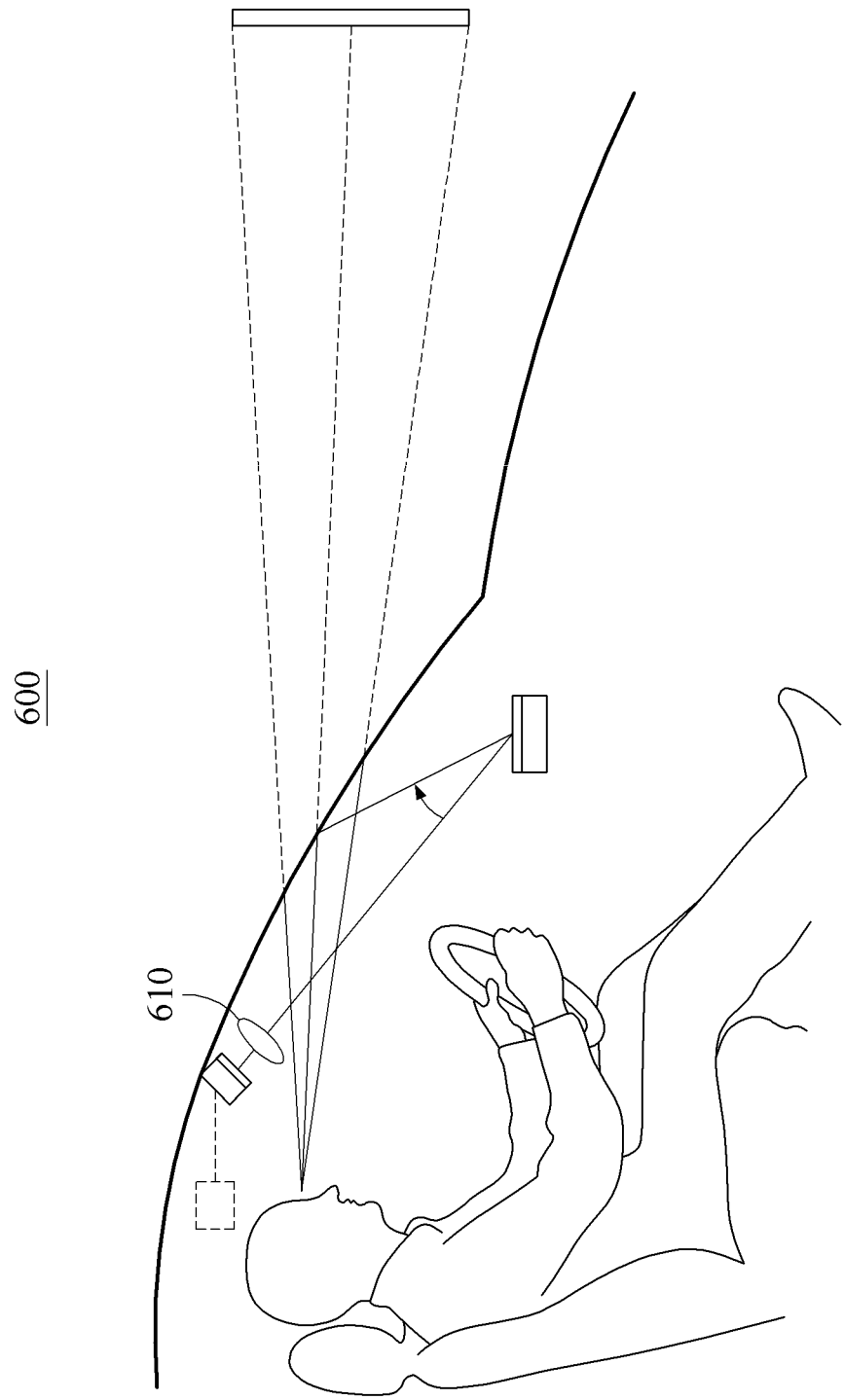
FIG. 6 illustrates a HUD device according to an exemplary embodiment.
Figure 7:
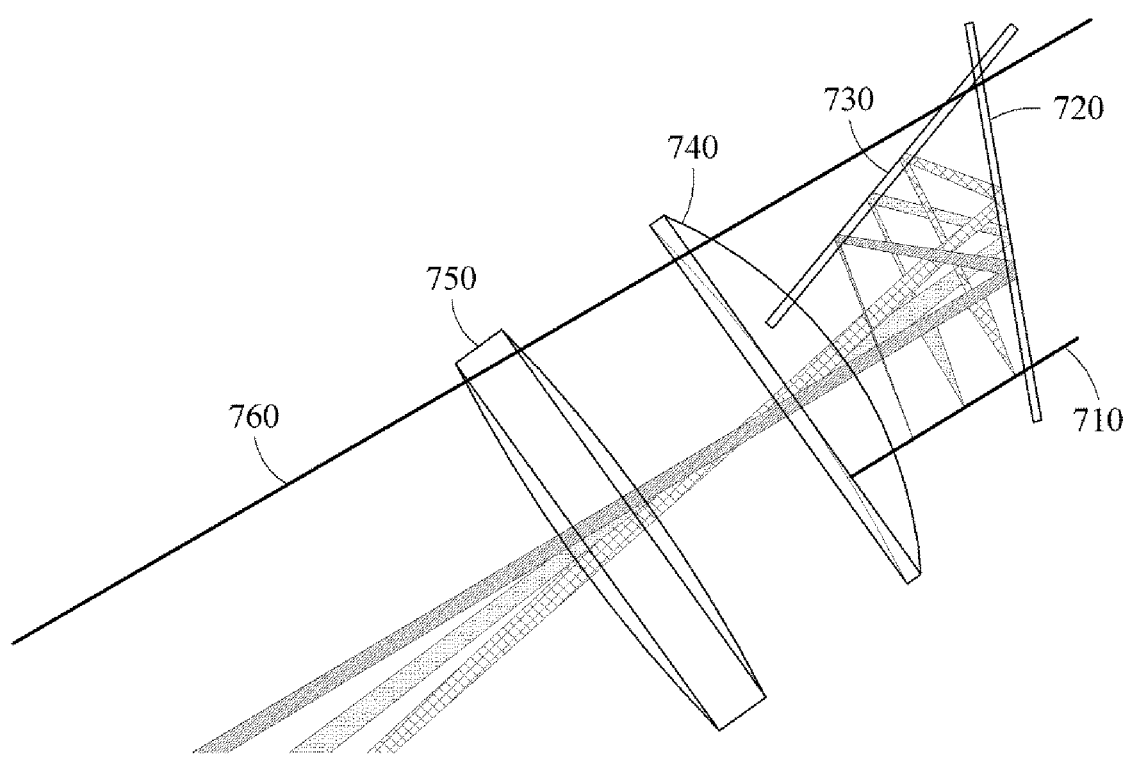
FIG. 7 illustrates an optical structure for a display according to an exemplary embodiment.

Referring back to FIG. 1, a distortion may occur in the panel image depending on a shape of the windshield. The optical element 130 may be designed to restrict the distortion occurring depending on the shape of the windshield. The HUD device 100 may include an aspheric lens between the display 120 and the optical element 130. The aspheric lens is illustrated in FIGS. 6 and 7. Referring to FIG. 6, a HUD system 600 may include an aspheric lens 610. The aspheric lens 610 may compensate for the distortion occurring in the panel image due to the shape of the windshield. The shape of the aspheric lens 610 may be determined based on the shape of the windshield. According to another embodiment, a different type of lens may be provided between the display 120 and the optical element 130. Referring to FIG. 7, a beam output from a display 710 may be reflected by mirrors 720 and 730 and pass through a spherical lens 740 and an aspheric lens 750. When the beam passes through the aspheric lens 750, a distortion caused by a windshield 760 may be compensated.

Figure 8:
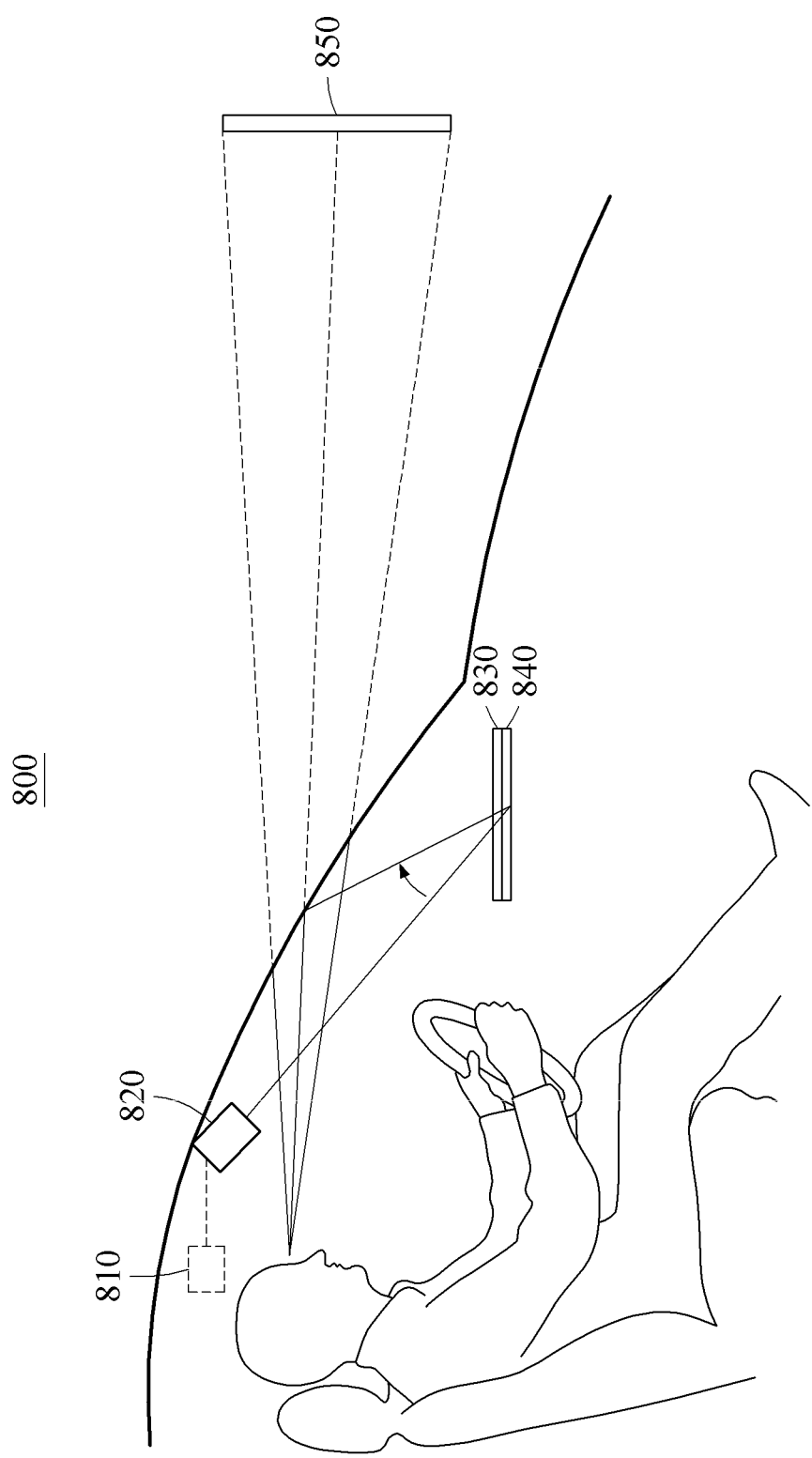
FIG. 8 illustrates a HUD device according to an exemplary embodiment.

FIG. 8 illustrates a HUD device according to an exemplary embodiment.

Referring to FIG. 8, a HUD device 800 may include a processor 810, a laser scanner 820, a holographic optical element (HOE) 830, and a holographic mirror 840. The processor 810 may generate source images including a virtual object and render a panel image based on the source images. The source images may include a first image corresponding to a first viewpoint and a second image corresponding to a second viewpoint. The processor 810 may determine a target position at which the virtual object is to be represented based on a position of a real object associated with the virtual object, generate the first image and the second image based on eye positions of a user and the target position, and render the panel image based on the eye positions of the user, the first image, and the second image.

The laser scanner 820 may be disposed in an upper region of a windshield of a vehicle, and form a virtual display layer through laser scanning. For example, the laser scanner 820 may perform laser scanning with a light corresponding to the panel image in a direction of a dashboard region, and the virtual display layer to represent the panel image may be formed through laser scanning. The virtual display layer may be formed in the HOE 830.

The HOE 830 may be disposed in the dashboard region, and control a path of a light corresponding to the virtual display layer. For example, the HOE 830 may be recorded based on a lenticular lens or a micro lens array and thus, may act as a 3D optical layer like the lenticular lens or the micro lens array.

The HOE 830 may be recorded to provide a 3D image corresponding to the panel image in a viewing space based on a position of the laser scanner 820 and a position of the viewing space. The viewing space may correspond to a space in which the user may continuously observe a 3D image at positions of eyes of the user or positions in vicinity of the eyes, even when moving from side to side. The viewing space may be predetermined and referred to as an eye box. The virtual display layer may include virtual pixels, which will be described further below. The HOE 830 may provide different images to both eyes of the user by assigning directivities to lights output through the virtual pixels.

The HOE 830 and the holographic mirror 840 may be recorded to refract only a light of a predetermined wavelength and transmit a light of a wavelength other than the predetermined wavelength. The predetermined wavelength may include a wavelength corresponding to R/G/B. For example, at least one of the HOE 830 and the holographic mirror 840 may be replaced with a general optical lens to which dichroic mirror coating, which selectively increases a reflectance with respect to a predetermined wavelength and increases a transmittance with respect to the other wavelengths, is applied. Thus, a noise light corresponding to the wavelength other than the predetermined wavelength may be filtered out.

The holographic mirror 840 may be disposed on a bottom surface of the HOE 830, and reflect the light corresponding to the virtual display layer and passing through the HOE 830 in a direction of an intermediate region of the windshield. The holographic mirror 840 may correspond to the holographic mirror 510 of FIG. 5. In addition, the description provided with reference to FIGS. 1 through 7 may apply to the HUD device 800.

Figure 9:
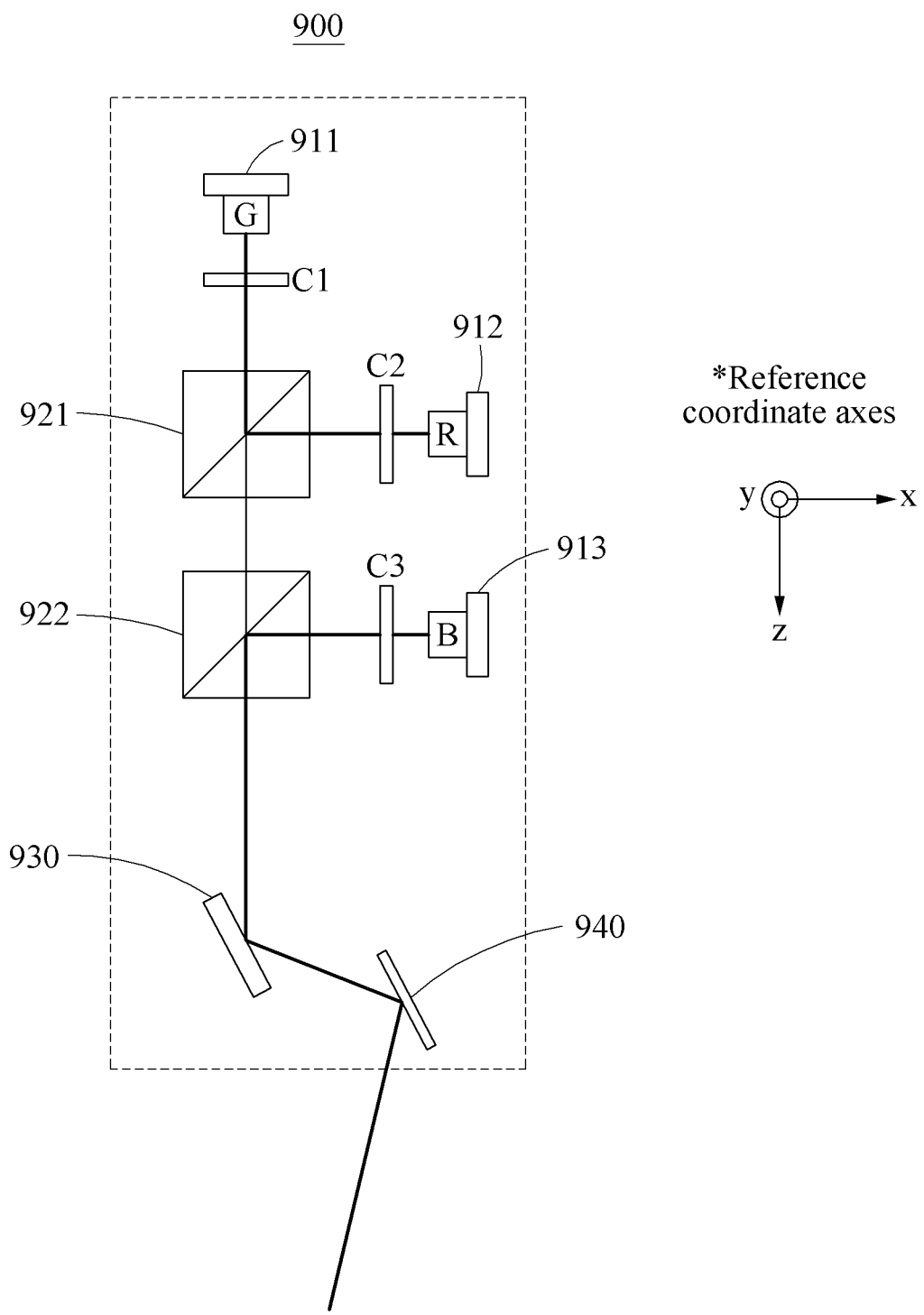
FIG. 9 illustrates a laser scanner according to an exemplary embodiment.

FIG. 9 illustrates a laser scanner according to an exemplary embodiment.

Referring to FIG. 9, a laser scanner 900 may include laser light sources 911, 912, and 913, condensers C1, C2, and C3, beam combiners 921 and 922, a reflecting mirror 930, and a scanning mirror 940. The laser light source 911 may output a red beam, the laser light source 912 may output a green beam, and the laser light source 913 may output a blue beam. The condensers C1, C2, and C3 may concentrate lights output from the laser light sources 911, 912, and 913, and the beam combiners 921 and 922 may synthesize outputs of the laser light sources 911, 912, and 913 into a single integrated beam. The reflecting mirror 930 may control a path of the beam. The scanning mirror 940 may control a direction of the integrated beam to scan the integrated beam to an optical layer.

The beam combiners 921 and 922 may include dichroic mirrors configured to reflect only a light of a predetermined wavelength and transmit lights of the other wavelengths. For example, a dichroic mirror, hereinafter, a first dichroic mirror, corresponding to the laser light source 911 may reflect only a red beam, and a dichroic mirror, hereinafter, a second dichroic mirror, corresponding to the laser light source 913 may reflect only a blue beam. A green beam may pass through the first and second dichroic mirrors, and the red beam may pass through the second dichroic mirror.

Thus, the outputs of the RGB laser light sources may be synthesized into the single integrated beam using the first and second dichroic mirrors.

The scanning mirror 940 may be manufactured using micro electro mechanical system (MEMS) technology, and generate a 2D image by reflecting laser beams concentrated on a single point through a tilting operation using two driving axes. A predetermined region in which the 2D image is formed may be referred to as a virtual display layer.

Figure 10:
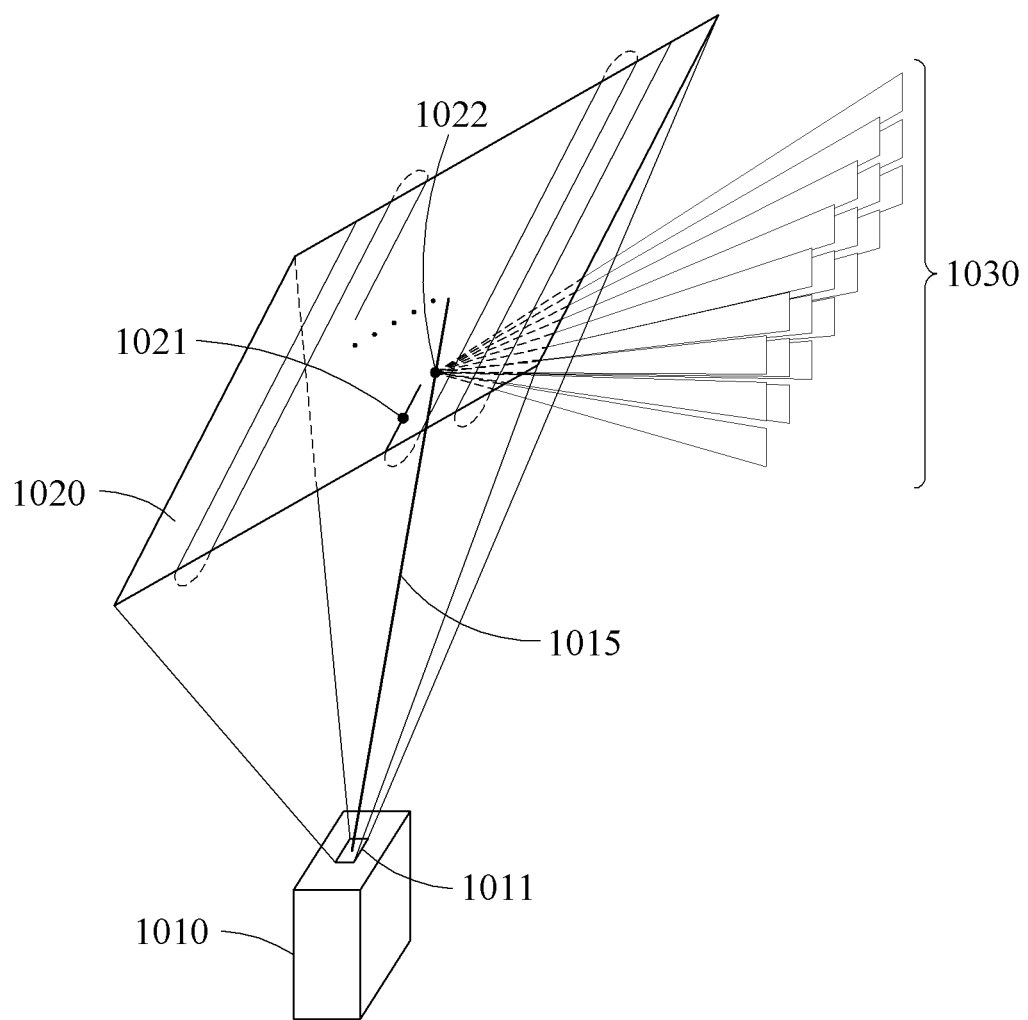
FIG. 10 illustrates a distribution of beams output by a laser scanner according to an exemplary embodiment.

FIG. 10 illustrates a distribution of beams output by a laser scanner according to an exemplary embodiment.

Referring to FIG. 10, a laser scanner 1010 may generate an integrated ray by mixing laser beams corresponding to a plurality of colors and scan the integrated beam to an HOE 1020 by tilting a scanning mirror 1011 using two driving axes. The laser scanner 1010 may generate a virtual display layer on the HOE 1020 by scanning the integrated beam to each line at a time while zigzagging from top to bottom of the HOE 1020. An example of a path along which the integrated beam is scanned to the HOE 1020 of FIG. 10 is illustrated. The laser scanner 1010 may generate a 2D panel image on the HOE 1020 through laser beam scanning.

The laser scanner 1010 may control on/off of a laser beam at a predetermined time interval based on image information, and separate laser beams corresponding to timings at which lasers are scanned may be generated. The separate laser beams may generate pixels on the virtual display layer. For example, a separate laser beam 1015 may be scanned at a position of an optical element 1022, and a single pixel may be generated at the position of the optical element 1022 by the separate laser beam 1015.

Such a pixel may be referred to as a virtual pixel or a laser scanned pixel. The virtual display layer may operate like a display panel through numerous virtual pixels generated on the virtual display layer. For example, the laser scanner 1010 may display a panel image on the virtual display layer by assigning pixel values corresponding to pixels of the panel image to the virtual pixels.

The HOE 1020 may include optical elements. An optical element may be a smallest unit to generate a multiview image. Lights output from the optical elements may be gathered at a predetermined pitch in a viewing space. The HOE 1020 may be recorded based on a lenticular lens or a micro lens array so as to act as a 3D optical layer like a lenticular lens or a micro lens array. The optical elements may optically correspond to lenses in the lenticular lens or lenses of the micro lens array.

The laser scanner 1010 may generate the virtual pixels to correspond to positions of the optical elements. For example, the laser scanner 1010 may generate virtual pixels at positions of optical elements 1021 and 1022. The optical elements may control directions of beams output from the optical elements based on directions of beams according to a relationship between the positions of the optical elements and positions of virtual pixels corresponding thereto such that the beams may be propagated in predetermined directions. Thus, points may be represented in a 3D space. For example, the optical element 1022 may output beams 1030 including different information in many directions based on a virtual pixel generated by the separate laser beam 1015. For ease of description, FIG. 10 illustrates an example in which a single laser beam is scanned to a single optical element. However, a plurality of laser beams may be scanned to a single optical element.

The HOE 1020 may generate beams like the beams 1030 in a 3D space based on the optical elements and the 2D panel image displayed on the HOE 1020. For example, beams to be generated in the 3D space may change based on a shape and a color, for example, image information, of the 2D image displayed on the HOE 1020. The panel image represented by the laser scanner 1010 may differ from the panel image represented on the display panel due to an optical difference of the HOE 1020 and the 3D optical layer combined with the display panel. For example, the panel image represented on the display panel may be rendered such that an appropriate 3D image corresponding to an optical characteristic of the 3D optical layer may be provided, and the panel image represented by the laser scanner 1010 may be rendered such that an appropriate 3D image corresponding to an optical characteristic of the HOE 1020 may be provided to the user.

A desired 3D image may be generated in a 3D space by controlling image information generated on the virtual display layer. For example, an image including a virtual object may be represented in the 3D space by controlling the image information of the panel image. The laser scanner 1010 may sequentially change a laser beam based on the image information, and tilt a scanning mirror through synchronization with the image information to send each beam including different information to a different position of the HOE 1020 based on a time. Lines illustrated in FIG. 10 are exemplarily provided, and thus lines generated on the HOE 1020 may also change based on the image information.

Figure 11A:
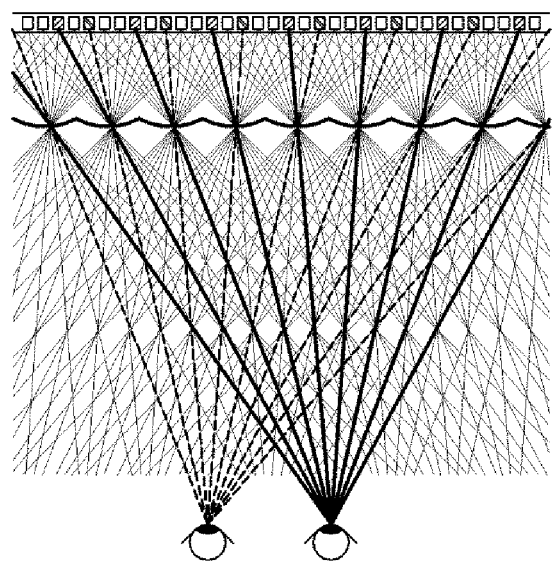
FIGS. 11A and 11B illustrate a display panel and a virtual display layer according to an exemplary embodiment.
Figure 11B:
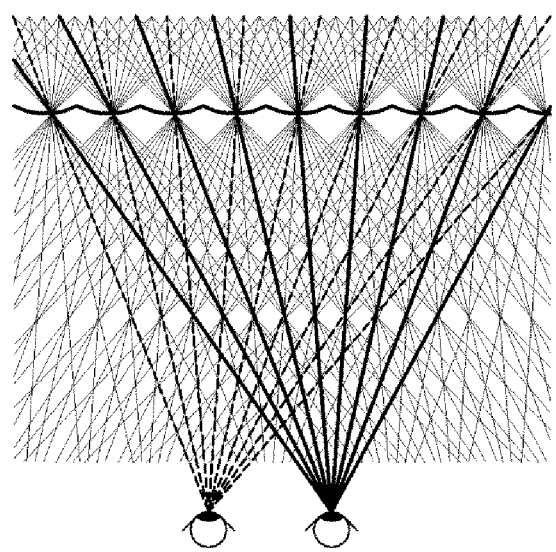

FIGS. 11A and 11B illustrate a display panel and a virtual display layer according to an exemplary embodiment.

Referring to FIGS. 11A and 11B, multiview display 1110 using a panel and multiview display 1120 using a virtual display layer are illustrated.

When multiview display is used to implement autostereoscopic 3D display, directions in which beams output from a plurality of pixels included in a panel are propagated uniformly to a 3D space may be indicated using multiple solid lines. A 3D display device of multiview display may include a panel and a lenticular lens. The beams generated from the pixels of the panel may propagate uniformly toward a user, having a predetermined direction by the lenticular lens attached to a front surface of the panel. When left and right images of different views are applied to pixels generating beams to be incident to left and right eyes of the user, the user may perceive a 3D image. Further, when multiple images with slightly different viewpoints are applied respectively to beams to be incident to the eyes and positions in the vicinity of the eyes at a predetermined interval, the user may continuously observe a 3D image even when the user moves from side to side. Each pixel may include subpixels. For example, a single pixel may include RGB subpixels.

A HUD device may include a laser scanner and an HOE. The HOE may correspond to a lenticular lens or a micro lens array of a 3D display device of multiview display, in that the HOE outputs a light scanned from the laser scanner as beams including different information in multiple directions. Although the HUD device does not include a panel, the HUD device may generate virtual pixels corresponding to RGB subpixels by scanning the light to the HOE through the laser scanner.

For example, the virtual pixels may be generated by controlling on/off of RGB laser light sources at scanning times corresponding to positions of RGB subpixels at a predetermined time interval based on image information. When the light scanned from the laser scanner is adjusted to correspond to positions of the subpixels of the display panel, a 3D image may be implemented as by a general 3D display device. In the multiview display 1120 using the virtual display layer, directions in which lights scanned from the laser scanner are propagated uniformly to a 3D space may be indicated using multiple solid lines.

Figure 12:
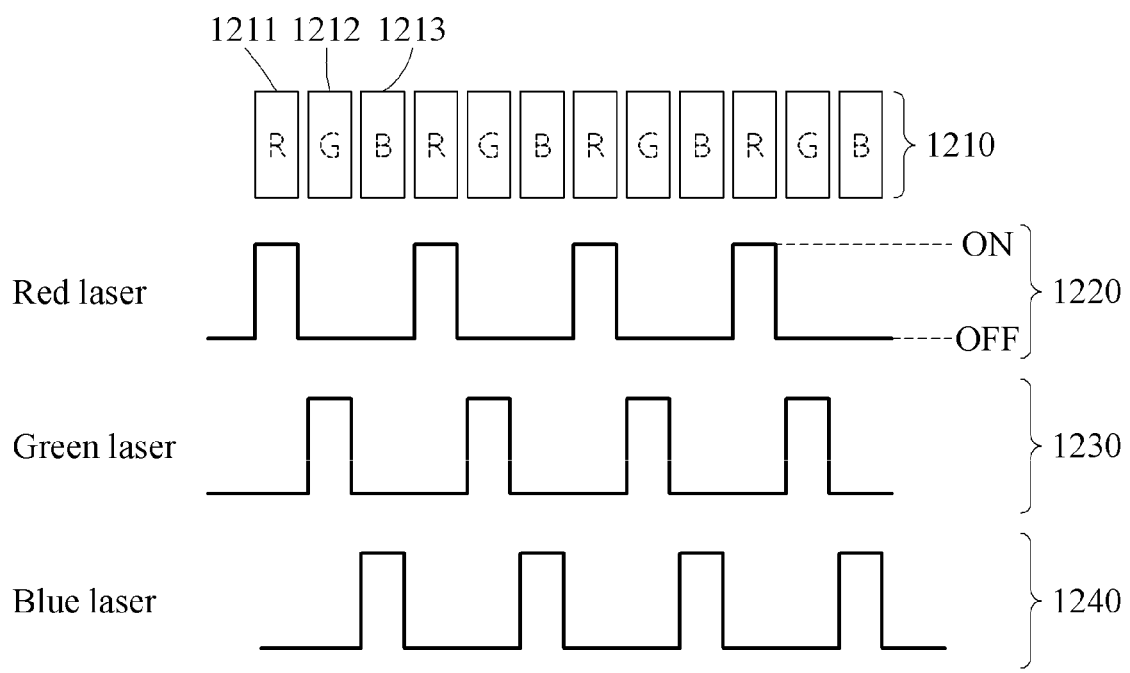
FIG. 12 illustrates a process of implementing virtual pixels on a virtual display layer according to an exemplary embodiment.

FIG. 12 illustrates a process of implementing virtual pixels on a virtual display layer according to an exemplary embodiment.

Referring to FIG. 12, an RGB panel 1210 may have a pixel structure in which a red subpixel, a green subpixel, and a blue subpixel in the same size are included in a single pixel. For example, a red subpixel 1211, a green subpixel 1212, and a blue subpixel 1213 may be included in a single pixel of the RGB panel 1210.

A laser scanner may generate an image on a virtual display layer using virtual pixels corresponding to RGB subpixels of a panel, without a panel. The laser scanner may generate virtual pixels or virtual subpixels by controlling on/off of RGB laser light sources at scanning times corresponding to positions of the RGB subpixels at a predetermined time interval based on image information. For example, the laser scanner may form red, green, and blue virtual subpixels in each of virtual pixels by controlling on/off timings of the RGB laser light sources. The RGB laser light sources may include a laser light source 1220 configured to output a red laser, a laser light source 1230 configured to output a green laser, and a laser light source 1240 configured to output a blue laser.

For example, by turning on the laser light source 1220 and turning off the laser light sources 1230 and 1240 at a scanning timing corresponding to a position of the subpixel 1211 of the RGB panel 1210, a virtual subpixel corresponding to the subpixel 1211 may be formed on the virtual display layer. Virtual subpixels corresponding to the subpixels 1212 and 1213 may be formed by operating the RGB laser light sources with respect to the subpixels 1212 and 1213 on the same principle.

Further, by controlling on/off of the RGB laser light sources projecting lasers to the subpixels at a predetermined time interval based on image information, colors represented by the virtual pixels may be adjusted. For example, a processor may determine pixel values of virtual pixels based on a panel image, and the laser scanner may control colors of the virtual pixels by controlling on/off timings of the laser light sources 1220, 1230, and 1240 based on the determined pixel values. Further, by adjusting brightness of the beams simultaneously with controlling on/off of the RGB laser light sources at a predetermined time interval based on the image information, a gray level may be represented.

Figure 13:
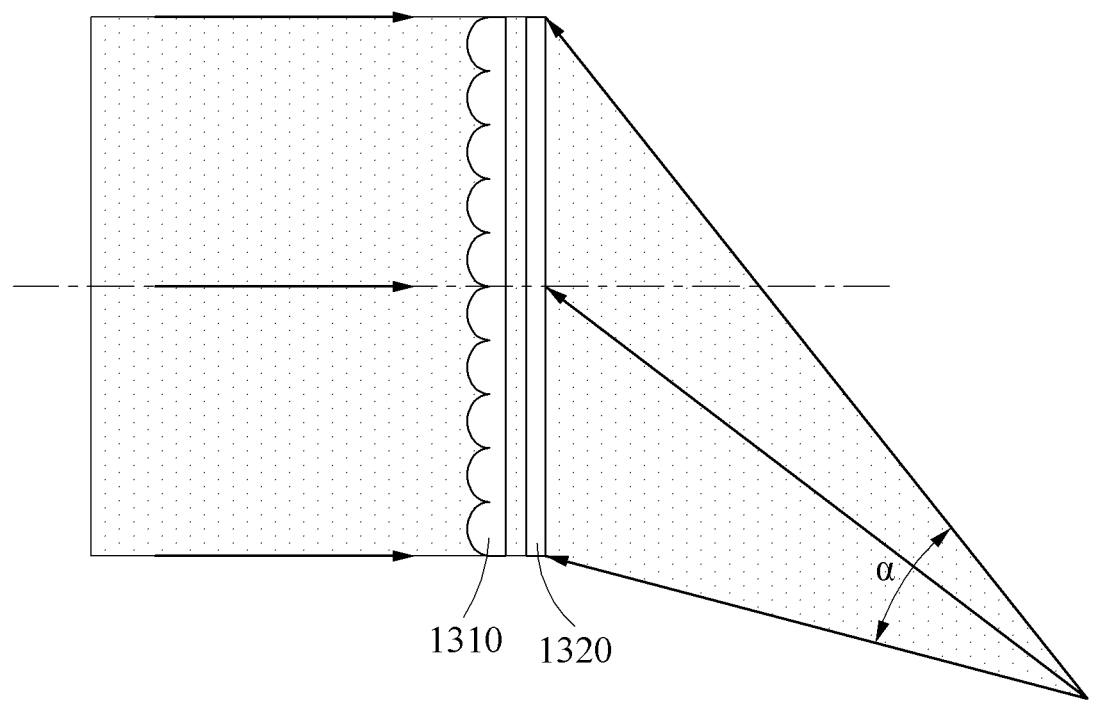
FIG. 13 illustrates a process of recording a holographic optical element (HOE) according to an exemplary embodiment.

FIG. 13 illustrates a process of recording an HOE according to an exemplary embodiment.

An optical element may include an HOE. The HOE may have a narrow wavelength bandwidth and be used as an optical device only in a region of a predetermined wavelength. A characteristic of a 3D optical layer 1310 may be recorded on the HOE based on the 3D optical layer 1310 and a photopolymer 1320. For example, the 3D optical layer 1310 may correspond to a lenticular lens or a micro lens array.

The process of recording the HOE may be performed based on a position of the laser scanner and a position of a predetermined viewing space. Optical elements having optical parameters may be formed in the HOE through the recording process. The optical parameters may be adjusted through the recording process. For example, refractive indices of the optical elements included in the HOE may be determined based on the position of the laser scanner and the position of the predetermined viewing space.

The process of recording the HOE may be performed based on a reference beam incident from the position of the laser scanner toward the 3D optical layer 1310 and the photopolymer 1320 at a predetermined divergence angle α and a signal beam horizontally proceeding toward the predetermined viewing space in a state in which the 3D optical layer 1310 and the photopolymer 1320 overlap.

Figure 14:
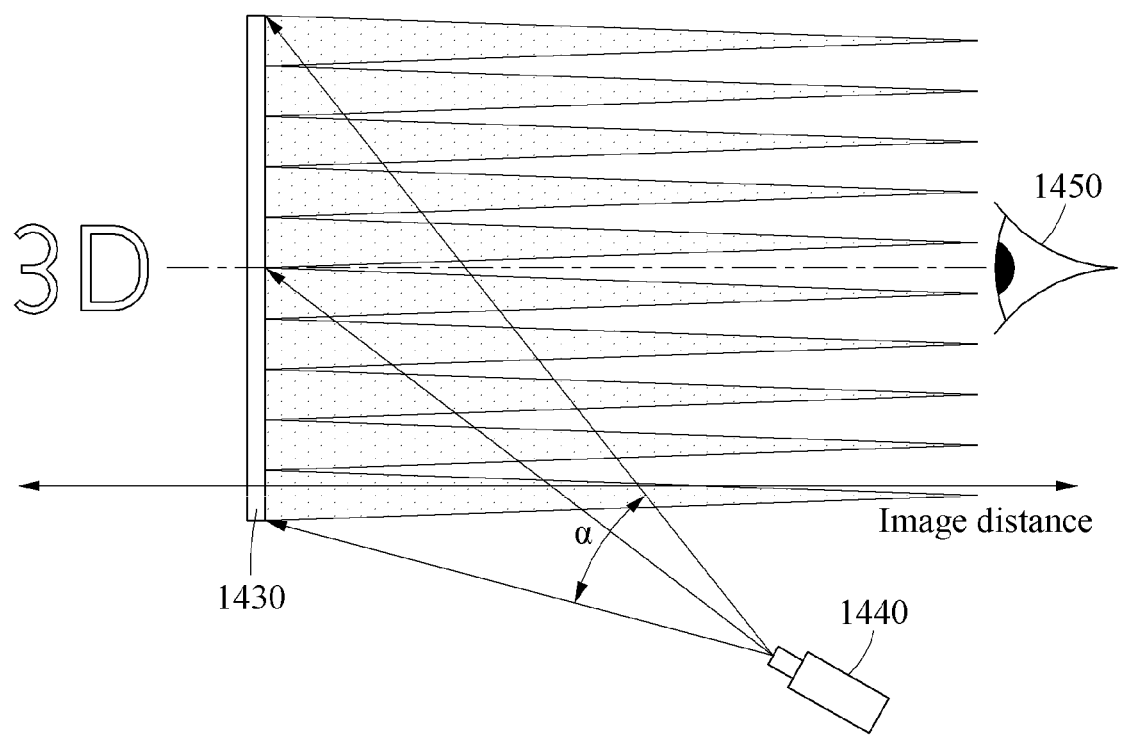
FIG. 14 illustrates a process of restoring an HOE according to an exemplary embodiment.

FIG. 14 illustrates a process of restoring an HOE according to an exemplary embodiment. Referring to FIG. 14, an HOE 1430 may be manufactured to refract only a light of a predetermined wavelength and to transmit a light of a wavelength other than the predetermined wavelength, and thereby act as a 3D optical layer such as a parallax barrier or a lenticular lens. For example, the HOE 1430 may be manufactured using the method described with reference to FIG. 13. In this example, the HOE 1430 may respond only to RGB laser beams and transmit lights of the other wavelengths. Further, the HOE 1430 may act as a 3D optical layer such as a parallax barrier or a lenticular lens. When a laser scanner 1440 scans a beam to the HOE 1430 at a divergence angle α and a position at which the recording is performed, a user may observe a 3D image in a predetermined viewing space 1450.

The exemplary embodiments described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described exemplary embodiments may be recorded in non-transitory computer-readable media including program instructions to implement various operations of the above-described exemplary embodiments. The media may also include, alone or in combination with the program instructions, data files, data structures, and the like. The program instructions recorded on the media may be those specially designed and constructed for the purposes of exemplary embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described exemplary embodiments, or vice versa.

A number of exemplary embodiments have been described above. Nevertheless, it should be understood that various modifications may be made to these exemplary embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A head-up display (HUD) device for providing three-dimensional (3D) augmented reality (AR), the HUD device comprising:
  a processor configured to generate first images including a 3D virtual object, and render a second image based on the first images;
  a display device comprising a display panel including a light source or a laser scanner, the display panel or the laser scanner being provided in an upper region of a windshield of a vehicle and configured to output a light corresponding to the second image in a direction of a dashboard region of the vehicle in a vicinity of a lower portion of the windshield; and
  an optical element provided in the dashboard region of the vehicle, the optical element configured to reflect the light corresponding to the second image in a direction of an intermediate region of the windshield,
  wherein the optical element comprises:
    a holographic optical element (HOE) configured to control a path of the light corresponding to the second image to provide a 3D image according to the second image; and
    a holographic mirror provided on a bottom surface of the HOE, the holographic mirror configured to receive the light corresponding to the second image via the HOE and reflect the light corresponding to the second image to the intermediate region of the windshield via the HOE,
    wherein the display panel or the laser scanner outputs the light corresponding to the second image towards the HOE from the upper region of the windshield of the vehicle, and
    wherein the upper region of the windshield of the vehicle is above the intermediate region of the windshield on which the light reflected by the optical element is displayed.

2. The HUD device of claim 1, wherein the first images include a third image corresponding to a first viewpoint and a fourth image corresponding to a second viewpoint, wherein the processor is further configured to render the second image based on eye positions of a user, the third image, and the fourth image.

3. The HUD device of claim 2, wherein the processor is further configured to determine a target position at which the 3D virtual object is to be represented based on a position of a real object associated with the 3D virtual object, and generate the third image and the fourth image based on the eye positions of the user and the target position.

4. The HUD device of claim 1, wherein the display device comprises:
  a 3D optical layer configured to control a path of the light corresponding to the second image.

5. The HUD device of claim 4, wherein the 3D optical layer is one of a parallax barrier, a lenticular lens, and a directional backlight unit (BLU).

6. The HUD device of claim 1, wherein the optical element comprises a holographic mirror or an aspheric mirror configured to enlarge the second image.

7. The HUD device of claim 1, wherein the laser scanner is further configured to form a virtual display layer to represent the second image through laser scanning.

8. The HUD device of claim 7, wherein the laser scanner is further configured to form virtual pixels on the virtual display layer by controlling an on/off timing of a laser light source.

9. The HUD device of claim 8, wherein the laser scanner comprises a first laser light source configured to output a red beam, a second laser light source configured to output a green beam, and a third laser light source configured to output a blue beam, and
  wherein the laser scanner is further configured to form red, green, and blue virtual subpixels in each of the virtual pixels by controlling on/off timings of the first laser light source, the second laser light source, and the third laser light source.

10. The HUD device of claim 9, wherein the processor is further configured to determine pixel values of the virtual pixels based on the second image,
  wherein the laser scanner is further configured to control the on/off timings of the first laser light source, the second laser light source, and the third laser light source based on the determined pixel values.

11. The HUD device of claim 7, wherein the HOE is recorded based on a lenticular lens or a micro lens array.

12. The HUD device of claim 7, wherein the HOE is recorded to provide a 3D image corresponding to the second image in a viewing space based on a position of the laser scanner and a position of the viewing space.

13. The HUD device of claim 1, further comprising:
  an aspheric lens configured to compensate for a distortion occurring in the second image due to a shape of the windshield.

14. A head-up display (HUD) device for providing three-dimensional (3D) augmented reality (AR), the HUD device comprising:
  a processor configured to generate first images including a 3D virtual object, and render a second image based on the first images;
  a display device provided in an upper region of a windshield of a vehicle, the display device configured to output a light corresponding to the second image, in a direction of a dashboard region of the vehicle in a vicinity of a lower portion of the windshield, using a 3D optical layer configured to control a path of the light corresponding to the second image and a display panel configured to display the second image; and an optical element provided in the dashboard region of the vehicle, the optical element configured to reflect the light corresponding to the second image in a direction of an intermediate region of the windshield, wherein the optical element comprises:
  a holographic optical element (HOE) configured to control a path of the light corresponding to the second image to provide a 3D image according to the second image; and
  a holographic mirror provided on a bottom surface of the HOE, the holographic mirror configured to receive the light corresponding to the second image via the HOE and reflect the light corresponding to the second image to the intermediate region of the windshield via the HOE, wherein the display panel outputs the light corresponding to the second image towards the HOE from the upper region of the windshield of the vehicle, and wherein the upper region of the windshield of the vehicle is above the intermediate region of the windshield on which the light reflected by the optical element is displayed.

15. The HUD device of claim 14, wherein the first images include a third image corresponding to a first viewpoint and a fourth image corresponding to a second viewpoint,
  wherein the processor is further configured to render the second image based on eye positions of a user, the third image, and the fourth image.

16. The HUD device of claim 15, wherein the processor is further configured to determine a target position at which the 3D virtual object is to be represented based on a position of a real object associated with the 3D virtual object, and generate the third image and the fourth image based on the eye positions of the user and the target position.

17. A head-up display (HUD) device for providing three-dimensional (3D) augmented reality (AR), the HUD device comprising:

a processor configured to generate first images including a 3D virtual object, and render a second image based on the first images;

a laser scanner provided in an upper region of a windshield of a vehicle, the laser scanner configured to form a virtual display layer to represent the second image by performing laser scanning with a light corresponding to the second image in a direction of a dashboard region of the vehicle in a vicinity of a lower portion of the windshield;

a holographic optical element (HOE) provided in the dashboard region of the vehicle, the HOE configured to control a path of a light corresponding to the virtual display layer; and a holographic mirror provided on a bottom surface of the HOE, the holographic mirror configured to receive the light corresponding to the virtual display layer via the HOE and reflect the light corresponding to the virtual display layer to an intermediate region of the windshield via the HOE, wherein the laser scanner outputs the light corresponding to the second image towards the HOE from the upper region of the windshield of the vehicle, and wherein the upper region of the windshield of the vehicle is above the intermediate region of the windshield on which the light reflected by the optical element is displayed.

18. The HUD device of claim 17, wherein the first images include a third image corresponding to a first viewpoint and a fourth image corresponding to a second viewpoint.

19. The HUD device of claim 18, wherein the processor is further configured to determine a target position at which the 3D virtual object is to be represented based on a position of a real object associated with the 3D virtual object, generate the third image and the fourth image based on eye positions of a user and the target position, and render the second image based on the eye positions of the user, the third image, and the fourth image.

* * * * *